United States Patent

[11] 3,627,633

| [72] | Inventor | Robert E. Magladry<br>Baltimore, Md. |
|---|---|---|
| [21] | Appl. No. | 680,659 |
| [22] | Filed | Nov. 6, 1967 |
| [45] | Patented | Dec. 14, 1971 |
| [73] | Assignee | Teledyne, Inc.<br>Los Angeles, Calif. |

[54] UNIQUE METAL HYDRIDE CONTROLLED REACTORS
7 Claims, 5 Drawing Figs.

| [52] | U.S. Cl. | 176/42, 176/20, 176/92 |
|---|---|---|
| [51] | Int. Cl. | G21c 7/02 |
| [50] | Field of Search | 176/20, 42, 92 |

[56] References Cited
UNITED STATES PATENTS

| 3,351,534 | 11/1967 | Magladry | 176/42 |
|---|---|---|---|

FOREIGN PATENTS

| 963,161 | 7/1964 | Great Britain | 176/42 |
|---|---|---|---|

Primary Examiner—Reuben Epstein
Attorney—Fleit, Gipple & Jacobson

ABSTRACT: Metal hydride controlled nuclear reactors involving thermally isolated, first and second sealed containers carrying metal hydride, one including nuclear fuel material and the other acting as a hydrogen reservoir. Means are provided to facilitate reactor startup. In different embodiments, they take the form of electrical heaters for the core and reservoir elements, chemical heaters for these elements and an additional source of hydrogen for these elements. Hydrogen disassociation is utilized to perform a cooling function during atmospheric reentry of reactors in spatial applications.

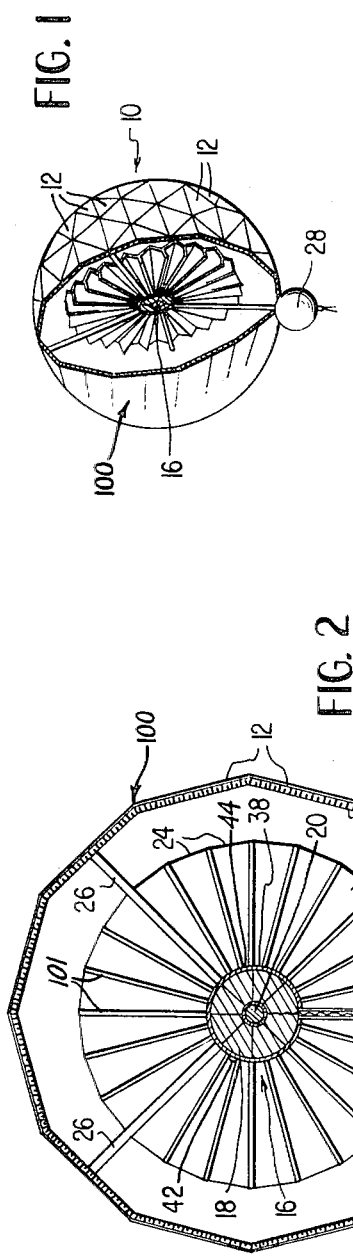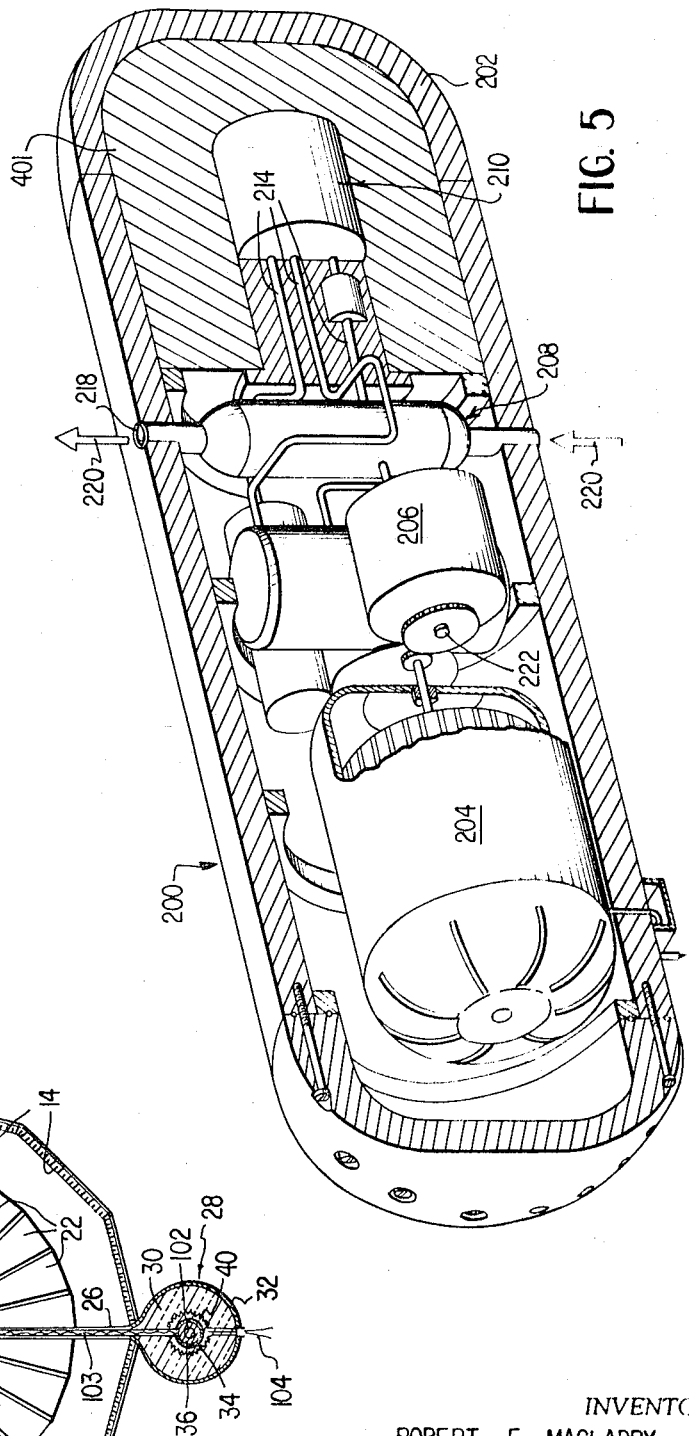
INVENTOR
ROBERT E. MAGLADRY

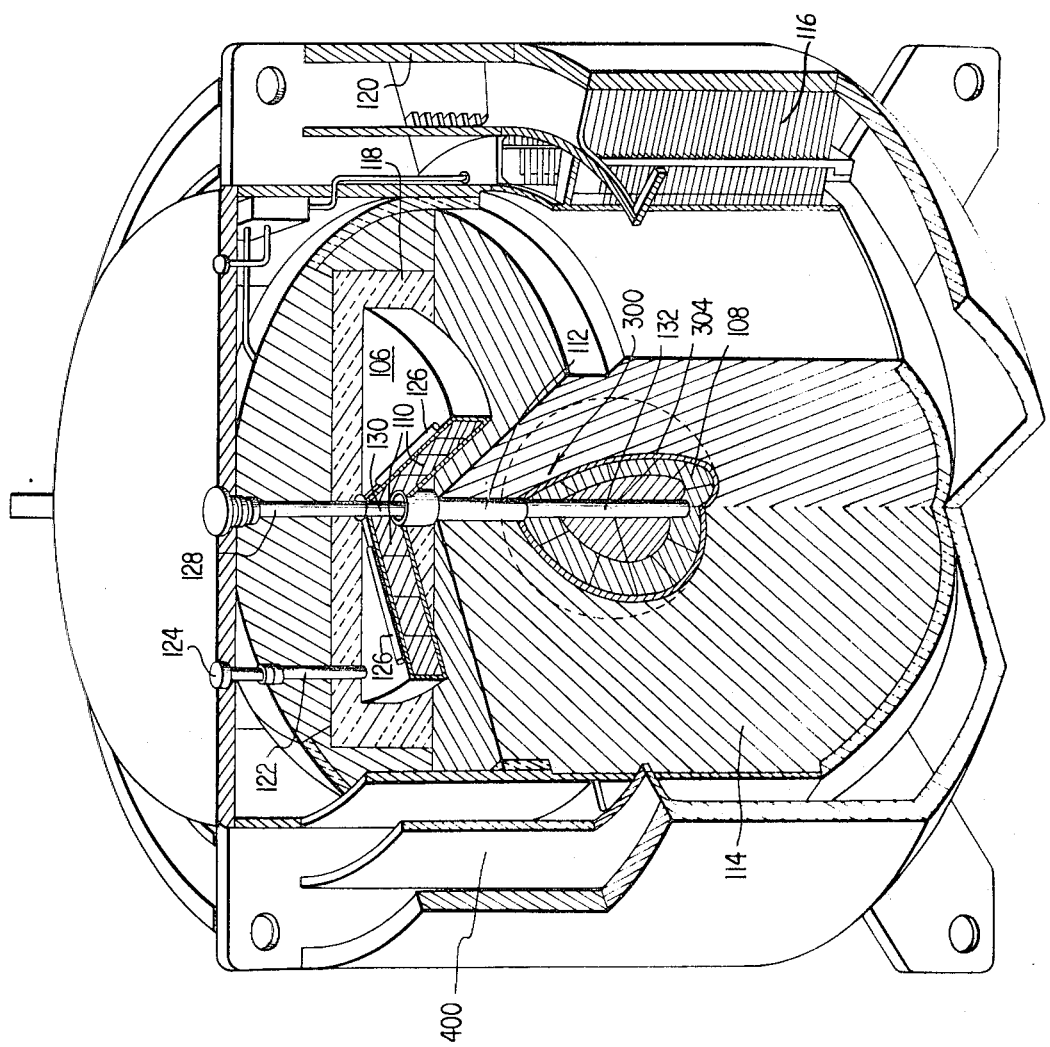
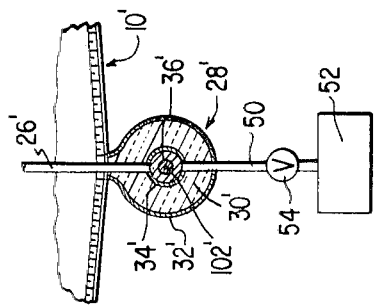
FIG. 3
FIG. 4
INVENTOR
ROBERT E. MAGLADRY
BY
ATTORNEYS

UNIQUE METAL HYDRIDE CONTROLLED REACTORS

CROSS-REFERENCES TO RELATED APPLICATIONS

This application relates to U.S. Pat. No. 3,351,534, issued Nov. 7, 1967 to Robert Magladry, filed Jan. 3, 1966, entitled "Hydrogen Diffusion Reactivity Control;" application Ser. No. 680,658 by Robert Magladry, filed Nov. 6, 1967 and entitled "Nuclear Reactor Control with H-Rho reflector and Absorber Means."

BACKGROUND OF THE INVENTION

1. Field of the Invention

This invention pertains to the nuclear reactor field and more particularly, to the startup and control aspects for such reactors for use in spatial, terrestrial and submarine environments.

2. Description of the Prior Art

In the nuclear reactor field, a completely passive system for regulating and controlling nuclear reaction has been recently developed under the designation metal hydride control. This method of control and regulation is set forth in the referred to U.S. Pat. No. 3,351,534. This control system involves a first portion of hydride material in operative relation to reactor fuel and a second portion of hydride material positioned exteriorly of the reactor core. Means are provided for allowing the migration of disassociated hydrogen between the two hydride portions, the core portion of the hydride material being subject to nuclear heat, while the second and external portion of hydride material is controllably heated by an electrical heating coil or like means. For startup and control, a desired temperature differential is created between the two portions of hydride material and the hydrogen concentration within respective sections of a hydride material is thereby varied.

In the initial design, the heating operation to facilitate startup was exclusively provided by heating means associated with the reservoir reaction.

SUMMARY OF THE INVENTION

The invention relates to a nuclear reactor of the passive metal hydride control type and consists of thermally isolated first and second sealed containers with the first container carrying both the metal hydride and the nuclear fuel material. The second container contains essentially only metal hydride material and one or more tubes coupling two containers to allow disassociated hydrogen to pass therebetween. In one form, for spatial application, exothermic materials are carried within interior and exterior hydride members with the subsequent chemical reaction of these materials releasing sufficient thermal energy for startup. In a second form, a separate source of hydrogen is selectively coupled to the sealed containers, whereby chemical absorption of this hydrogen by specially provided material effects fast and efficient startup.

For terrestrial and submarine applications, the hydrogen transport tube connecting the first and second sealed containers coaxially contains means, such as a Calrod, produced by the General Electric Company, for heating the incore element. Other electrical heating means are provided for simultaneously heating the reservoir element for startup purposes.

The reactor may be selectively coupled, particularly advantageous in submarine applications, by circulated coolant in the form of a gas to a Sterling heat engine in which the engine is driven by the circulated gas and at the same time, the gas is pressurized to ensure continued circulation between the reactor and the engine itself.

BRIEF DESCRIPTION OF THE DRAWINGS

FIG. 1 is a perspective view, partially in section, of a metal hydride controlled reactor powered generator involving the unique startup means of the present invention.

FIG. 2 is an elevational view, in section, of the reactor control generator of FIG. 1.

FIG. 3 is a partial elevational view of a thermoelectric generator assembly for spatial application incorporating a metal hydride controlled reactor with another form of efficient reactor startup.

FIG. 4 is a perspective view, partially in section, of a metal hydride controlled reactor powered generator for terrestrial application incorporating yet another form of startup control for the reactor.

FIG. 5 is a perspective view of a metal hydride controlled reactor as employed in a submarine application involving a Sterling engine powered by the pressurized gas reactor coolant.

DESCRIPTION OF THE PREFERRED EMBODIMENTS

The embodiments of the present invention are to be contrasted to the basic metal hydride control reactor design, as set forth in referred to U.S. Pat. NO. 3,351,534. In the basic design, the reactor employed an electrical heating coil which surrounds that portion of the metal hydride material external of the reactor core, whereby reactor startup involves the application of electrical energy to the coil with the resultant temperature differential between the ends of the hydride rod driving disassociated hydrogen from the coil end to the core end with resultant increase in reactivity.

Referring to FIG. 1, the reactor powered, thermoelectric generator, indicated generally at 10, is provided for spatial application and consists of an outer shell 100, which is generally spherical in form and consists of a plurality of connected triangular-shaped panels 12 carrying the thermoelectric converter means, the outer surface of the panels being covered with a thin layer of metal, shown at 100 such as aluminum or beryllium, to provide a highly emissive surface. The reactor core sphere 16, for a 250-watt power system, is approximately 11 inches in diameter and compares to the 32 inch overall diameter of the outer shell. The sphere 16 contains about 9 kg. of U-235 nuclear fuel, the fuel elements comprising a thin annulus 18 of porous uranium-zirconium hydride which in turn surrounds an inner sphere 20 of exothermic material, such as Thermite, manufactured by the Atlas Powder Company. Heat is transported outwardly from the reactor sphere 16 by means of heat pipes 101 which radiate the heat to the inside surface of the thermoelectric panels 12. The panels 12 may employ thermoelectric elements 14 of the germanium-silicon type. Geodesic ducts 22 radiate outwardly from the reactor core sphere 16, the outer end 24 of the ducts terminating short of the thermoelectric panels 12. The structure is lightweight with the inner section being supported by, and spaced from, the outer panels 12 by a number of small diameter tubes 26. One tube or pipe 26 connects the reactor sphere 16 to a second porous zirconium-hydride sphere 28 which acts as the hydrogen reservoir. The reservoir sphere 28 is insulated by placing thermal insulation 30 between outer shell 32 and inner shell 34. The inner shell 34, typically formed of molybdenum or beryllium, surrounds the metal hydride material 36 to form a second sealed container of hydride material, while the shell 38 of the same material as the core sphere 16 forms the first sealed container of hydride material, the containers being fluid-coupled by the tube 26. Positioned internally of the metal hydride material 36 is a sphere 102 of exothermic material similar to that comprising sphere 20. Reactivity control is provided by hydriding the reactor sphere 16 to the desired degree. The reservoir sphere 28 either absorbs or liberates hydrogen as required. The solubility of hydrogen in zirconium or uranium-zirconium alloy is dependent upon temperature. The core must have a given amount of hydrogen in solid solution in order to achieve criticality. If the core sphere 16 overheats, hydrogen leaves the core and flows through the connecting tube or pipe 26 to the reservoir 28 where it is absorbed. When the core cools, the hydrogen returns to the core from the reservoir. In line with the basic metal hydride controlled reactor design, the reservoir hydride material 36 is appropriately heated by an electrical heating coil 40 which surrounds the second (reservoir) hydride container, thereby driving disassociated hydrogen through tube or pipe 26 to the core sphere 16. The process is completely automatic and passive. In the present design, a fuse 103 connects the spheres 20 and 102 of exothermic material which are ignited by electrical energy provided through leads 104. These same leads may be utilized to energize heating coil 40. Upon ignition, the spheres 20 and 102 quickly release a sufficient amount of heat to bring both the spherical body 16 and the reservoir 28 to appropriate operating temperatures.

Referring next to FIG. 3, a modified startup scheme is shown as employed to a reactor powered thermoelectric generator assembly for spatial application. The generator assembly 10' is identical to the spherical structure 10 of the embodiment of FIGS. 1 and 2, except the spheres 20 and 102 are not comprised of exothermic material, but rather of material, such as uranium or palladium, which will quickly hydride at environmental temperatures. Again, the tube or pipe 26' connects the thermally isolated and separate metal hydride portions. The spherical reservoir portion 28' again includes thermal insulation 30' between outer shell 32' and inner shell 34' for thermally isolating the pure metal hydride 36' which fills the container formed by shell 34'. The fuse 103 is absent in this embodiment and startup is achieved by connecting a pipe or tube 50 from the reservoir hydride section 36' and specifically, the container formed by the inner shell 34', to a container 52 of hydrogen under relatively high pressure. A valve 54 between the container 52 and the reservoir hydride section 36' is selectively opened by means (not shown) permitting the hydrogen, under suitable pressure, to enter initially the reservoir sphere 32' and filter into the spheres 102' and 20' of low temperature hydridable material. The absorption of hydrogen by the hydridable material in spheres 102' and 20' is a highly exothermic process.

In either the embodiment of FIGS. 1 or 3, the employment of the metal hydride control means inherently provides a system safety feature. Due to the high heat of solution of hydrogen in zirconium, the hydrogen controlled space reactor may safely reenter the earth's atmosphere from a steep reentry course by allowing for the venting of hydrogen with the heat of reentry being absorbed by the hydrogen as it leaves the reactor and the reservoir spheres. A major concern in the use of nuclear devices in space is the fact that these devices may overheat on reentry from space as they go through the atmosphere with the overheating compromising the structural integrity of the assembly and resulting in the radioactive contents being dispersed in the atmosphere. The heat of reentry may be readily absorbed in the disassociation of hydrogen from zirconium, all that is required is means provided by the system for allowing the hydrogen to be released from the sealed container or containers forming the spaced metal hydride sections. In simplified form, a number of patches 42 are provided on the outside of the reactor sphere 16 with these patches being made up of an alloy which has a relatively low melting point, such as an aluminum alloy. When the nuclear powered thermoelectric generator assemblies 10 and 10' reenter the atmosphere, the thermoelectric panels 12 and the geodesic ducts 22 do not have any vapor integrity, and simply melt away. This exposes a series of duct patches 42 which may be integrally formed with the outer shell 44 surrounding hydride portions 18 and 20 of the core 16. As the patches melt, the hydride contents of the spherical container 16 are no longer sealed but open to the atmosphere. Any hydrogen that is then released from the reactor core may readily escape the container through the patch holes. The outer relatively light structure, including the thermoelectrics simply abates away. In such a device, since the patches dissolve or open, a reasonable fraction of the hydrogen is vented and if the device, for instance, drops into the water as it contacts the earth's surface, there is simply not enough hydrogen present in the water, that is, not enough moderating effect to make the reactor go critical.

For terrestrial use, the metal hydride controlled nuclear reactor assembly may, of course, be of much greater mass than those employed in spatial application. Further, radiation shielding becomes much more important. Referring to FIG. 4, there is shown one embodiment of a terrestrial or submarine reactor control thermoelectric generator assembly. The reactor portion 300 involves a reactor core section 304 and a reservoir section 106 in container form. The core section 304 contains uranium-zirconium alloy, which is hydrided. The reservoir 106, in sealed container form, is pan-shaped in configuration and is filled with zirconium hydride 110 with a relatively large diameter pipe 112 connecting to the fueled, hydrided core container 304. The core section of the assembly is embedded in a copper block 114 which serves several functions. The copper is a very effective barrier to the leakage of hydrogen which could escape from core hydride container 304, reservoir hydride container 106 or the connecting tube 112. Further, copper has rather massive atoms and acts as a good reflector of neutrons for the reactor. Since copper is a good thermal conductor, it provides a ready means for distributing reactor heat to the surrounding thermoelectric converter comprising an annular assembly 116 surrounding the copper body 114. The large mass copper body 114 further acts as a physical container for the system and would, if the reactor should explode, although the probability is extremely small, act as a massive ductal container. The copper would also act as a radiation shield for the thermoelectric converters 116. It is noted that the reservoir container 106 is effectively isolated thermally by insulation means 118, typically formed of diatomaceous earth, which surrounds the container with a portion positioned between the container and the copper body 114 surrounding the reactor core section. Waste thermal energy is readily dissipated by convection with the assembly of FIG. 4 being supported on the earth's surface in the path of moving air, or alternatively when underwater, water readily covers and fills the passages 400 formed by the outer metal casing 120. For initially hydriding the zirconium alloy materials 108 and 110 within respective core and reservoir sections, a pipe 122 extends upwardly from the container 106 and carries a cap 124 for sealing off container 106 once hydriding is achieved.

Of importance to the present invention is the means for facilitating startup of the reactor powered generator. In the embodiment of FIG. 4, the electrical heaters 126 in rod form which are associated with the reservoir container 106 do not have enough thermal capacity to initially bring the reactor to a high enough temperature so that the metal hydride control process is both rapid and efficient. In this embodiment, a startup electrical heater in the form of a long thin rod 128 is positioned within the bore of connecting pipe 112 between the reservoir and core hydride section. The diameter of the electric heating rod 128 is smaller than the internal diameter of the pipe 112 so as not to interfere with the passage of disassociated hydrogen between the core container 104 and the reservoir container 106. The rod-type electrical heater 128 is suitably energized (by means not shown) to cause the hydride material 108 within the core section to come rapidly up to temperature. Of course, after startup, energization of the rod-type electric heater 128 ceases with self-control taking place, the level of which is set by controlled energization of the heaters 126 associated only with the reservoir container 106. Preferably, a single, central hollow tube or pipe 112 is sufficient, which acts both as a hydrogen passage between the reservoir and core and also as a means to receive the electric heater 128 for heating the hydride material in the core simultaneously or the heaters 126 energize the reservoir, thereby both elements being quickly raised to an acceptable threshold or environmental temperature which will allow prompt reaction. It is envisioned that the employment of the central elongated heater 128 which passes through both the reservoir and core portions of the hydride is primarily to achieve startup and once the reactor is started, this auxiliary heater is not required. However, if the power level is very low, a neutron signal might be fed back to heater 128 through a feedback control of the reactor powered generator as set forth in my copending application Ser. No. 680,658, filed Nov. 6, 1967, entitled "Nuclear Reactor Control with H-Rho Reflector and Absorber Means." In the form shown, the fuel loading may comprise 93% enriched U-235. During startup, for a generator providing a net output power of 1-kwe electrical, the reservoir and core are brought up to about 1,000° F. by energizing the heater 128. The reservoir operating heater means, in the form of thin rod heaters 126 coupled to the reservoir casing, are set at a predetermined power level. The reactor core then goes critical and proceeds to match the thermal load. A final adjustment of reservoir heat power is made and the heaters 126 are then selectively coupled (by means not shown) to the thermoelectric generator means 116 for self-powering. Self-control continues with disassociated hydrogen flowing to and from the spaced first and second containers of hydride material 304 and 106, respectively.

Referring to FIG. 5, there is shown a metal hydride controlled nuclear reactor in a submarine environment. The assembly 200 includes an elongated metal casing 202 which holds, from left to right, an electrical generator 204, a heat (Sterling) engine 206, a heat exchanger 208 and an H-Rho controlled nuclear reactor 210. The reactor 210 is suitably positioned within a mass of suitable shielding material 401, such as borated polyethylene, or other neutron reflector material. The metal hydride controlled nuclear reactor 210 may be identical to the reactor portion of the system described in my copending application Ser. No. 680,618, filed Nov. 6, 1967, entitled "Gravity Oriented H-Rho Reactor Powered Generator." The thermal energy is removed from the reactor core by circulating a suitable coolant, such as an inert gas like argon, or other gases, such as helium, between the reactor and the thermal energy converters, such as Sterling engine 206. In this case, it is not necessary for the reactor 210 to be oriented in any particular manner with respect to gravity. The coolant tubes 214 carrying the coolant gases pass from reactor 210 to the Sterling engine 206 and back through a heat exchanger 208. The heat exchanger 208 is provided with a vertical passage 218 through which passes the environmental liquid of the submarine assembly 200. The arrows 220 indicate the path of the environmental liquid through the heat exchanger for removing the waste thermal energy. However, a portion of the thermal energy is delivered by the coolant circulating pipes 214 to the Sterling engine 206 where it is converted from thermal energy into mechanical form. The Sterling engine or other heat engine is quite attractive, because in a single unit, it provides both the means for rotating the output shaft 222 and delivering mechanical energy while at the same time, it pumps the gaseous coolant being circulated through pipes 214 to and from the reactor 210. In addition, the Sterling engine is employed because it is very efficient in principle for rather low coolant operating temperature. Obviously, the electrical output from generator 204 may be supplied to one or more drive motors (not shown) for driving the unit 200 along an underwater path.

What is claimed is:

1. In a nuclear reactor of the passive metal hydride control type including thermally and environmentally isolated reactor core and reservoir portions of metal hydride material and first passage means fluid coupling said portions to allow disassociated hydrogen to flow reversibly therebetween, the improvement comprising:

second means operatively disposed in said core and reservoir metal hydride portions for simultaneously raising the threshold temperature of said core and reservoir hydride material portions, said second means comprising exothermic material.

2. In an nuclear reactor of the passive metal hydride control type including thermally and environmentally isolated reactor core and reservoir portions of metal hydride material and first passage means comprising a tube for fluid coupling said portions to allow disassociated hydrogen to flow reversibly therebetween, the improvement comprising: second means operatively disposed on said core and reservoir metal hydride portions for simultaneously raising the threshold temperature of said core and reservoir hydride material portions, said second means comprising an electrical heater carried within said tube and operatively disposed with respect to said core metal hydride portion and said reservoir portions.

3. In a nuclear reactor of the passive metal hydride control type including thermally and environmentally isolated reactor core and reservoir portions of metal hydride material and first passage means fluid coupling said portions to allow disassociated hydrogen to flow reversibly therebetween, the improvement comprising: second means operatively disposed on said core and reservoir metal hydride portions for simultaneously raising the threshold temperature of said core and reservoir hydride material portions, said second means comprising low temperature hydridable material carried within at least said reactor core portion, an independent source of hydrogen, and means for selectively coupling said source to at least said reactor core portion.

4. The reactor as claimed in claim 2 wherein said electrical heater is in rod form and has a diameter less than the internal diameter of said tube.

5. The reactor as claimed in claim 3 wherein said independent source of hydrogen comprises a sealed container carrying said hydrogen under pressure, and said reactor further including a tube coupling said sealed container to said reservoir metal hydride portion and valve means carried by said tube for controlling flow from said sealed container to said reservoir metal hydride portion.

6. The nuclear reactor as claimed in claim 4 wherein said reactor core and reservoir metal hydride portions are carried in sealed containers and said sealed containers are coupled in axial alignment by said connecting tube, said reactor further including a copper heat sink and neutron reflector surrounding said reactor core container and thermal insulation means surrounding said reservoir container.

7. The nuclear reactor as claimed in claim 6 wherein said sealed metal hydride core container is spherical in configuration and said reservoir container is pancake in configuration with said threshold heater passing through the center of said pancake-shaped reservoir container and said reactor further includes; a plurality of control heaters in rod form carried by said pancake-shaped reservoir containers in contact with the outer surface thereof and extending radially outward from said threshold heater.

* * * * *